Feb. 13, 1951 L. A. STINSON 2,541,840
AUTOMATIC SHOW CARD PRINTING MACHINE
Filed March 23, 1948 18 Sheets-Sheet 1

INVENTOR
LYMAN A. STINSON
By Harry H. Hitzeman
ATTORNEY.

Feb. 13, 1951 L. A. STINSON 2,541,840
AUTOMATIC SHOW CARD PRINTING MACHINE
Filed March 23, 1948 18 Sheets-Sheet 3

INVENTOR
LYMAN A. STINSON
BY Harry H. Hitzeman
ATTORNEY.

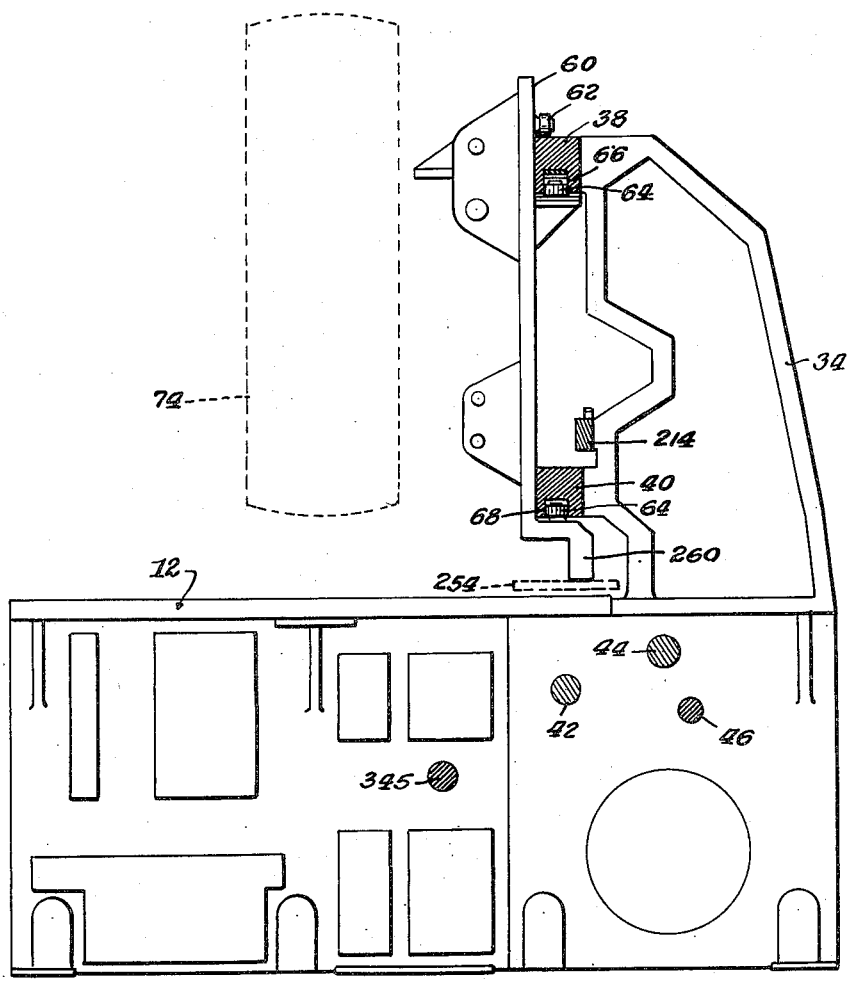

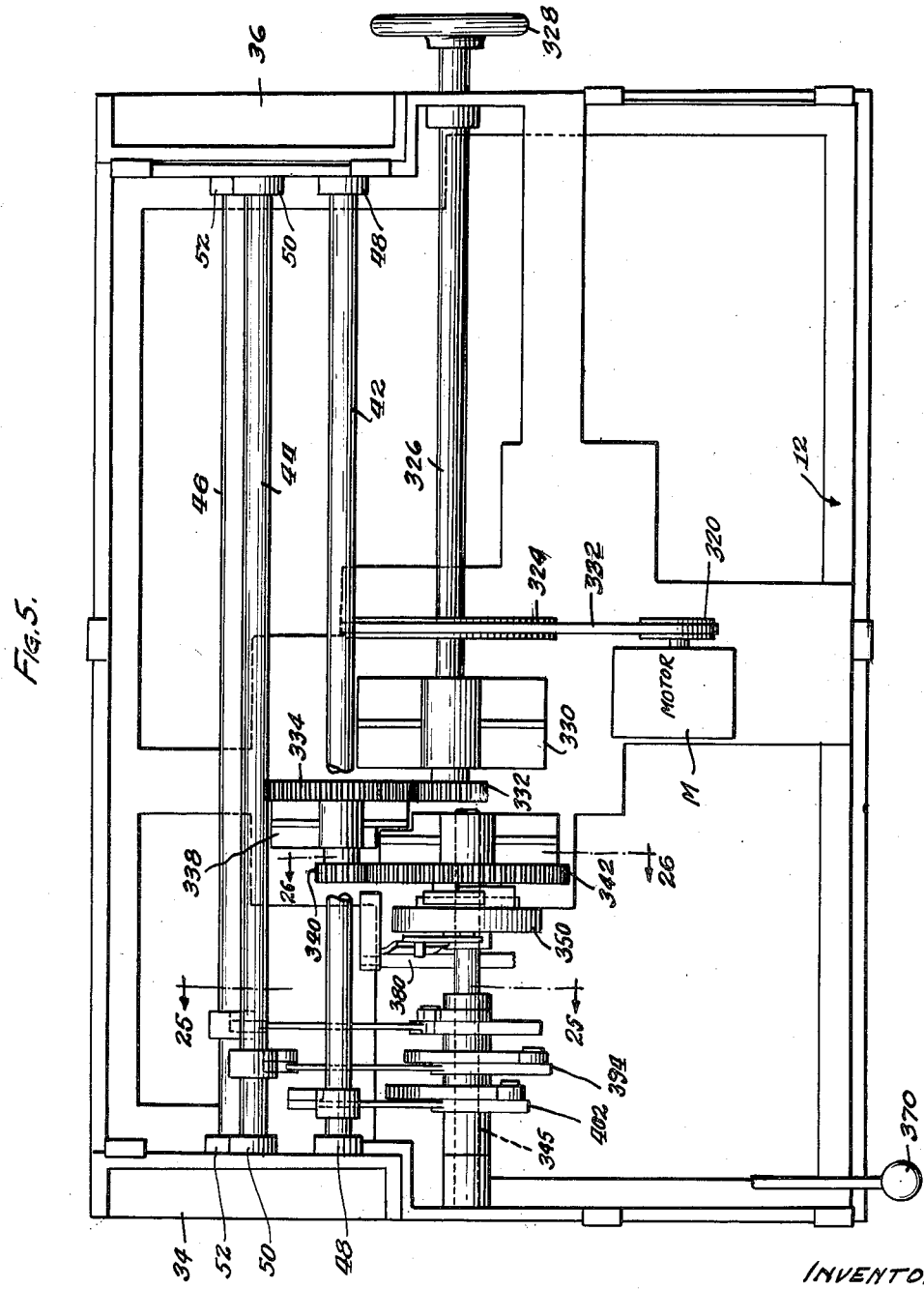

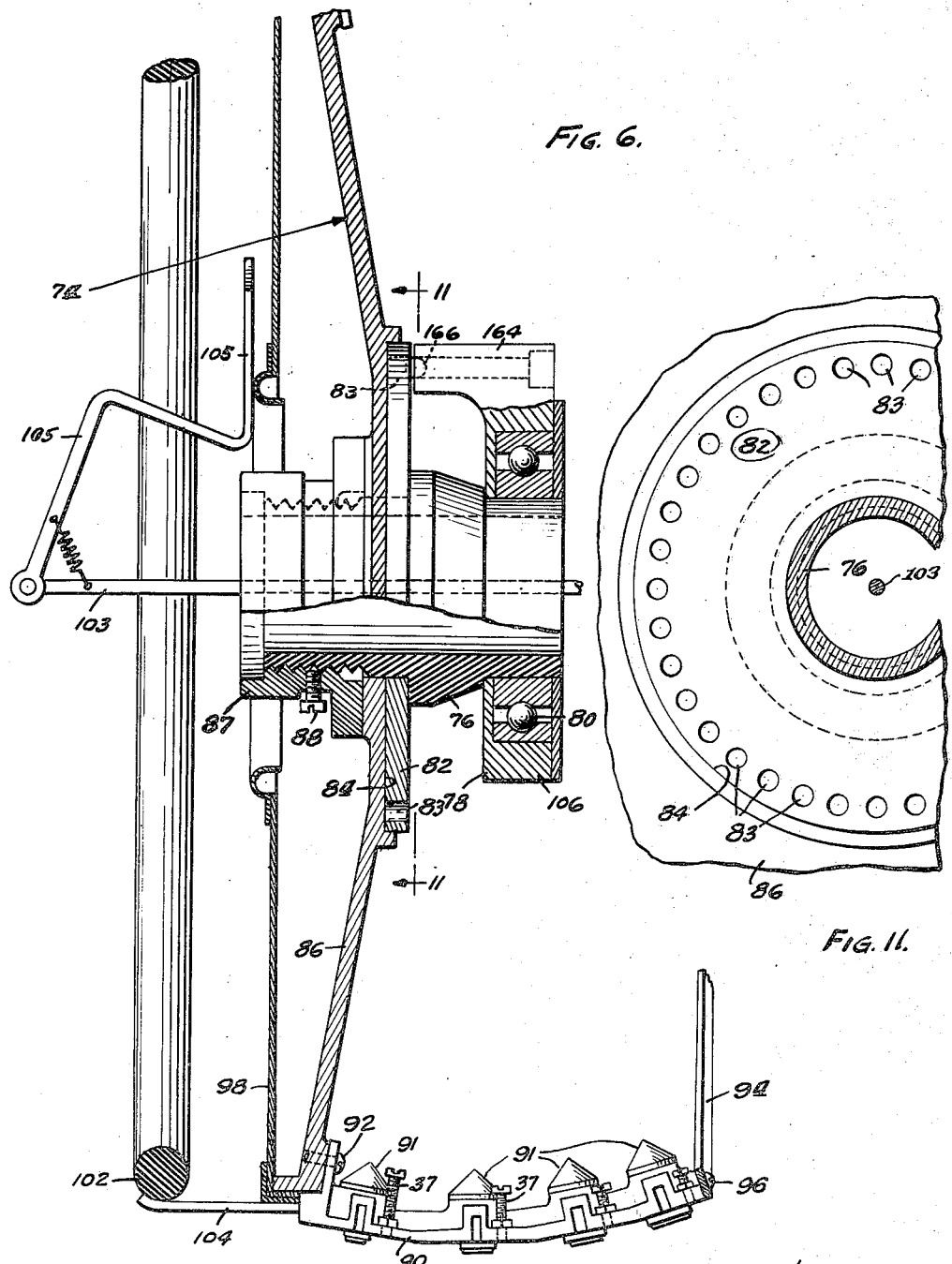

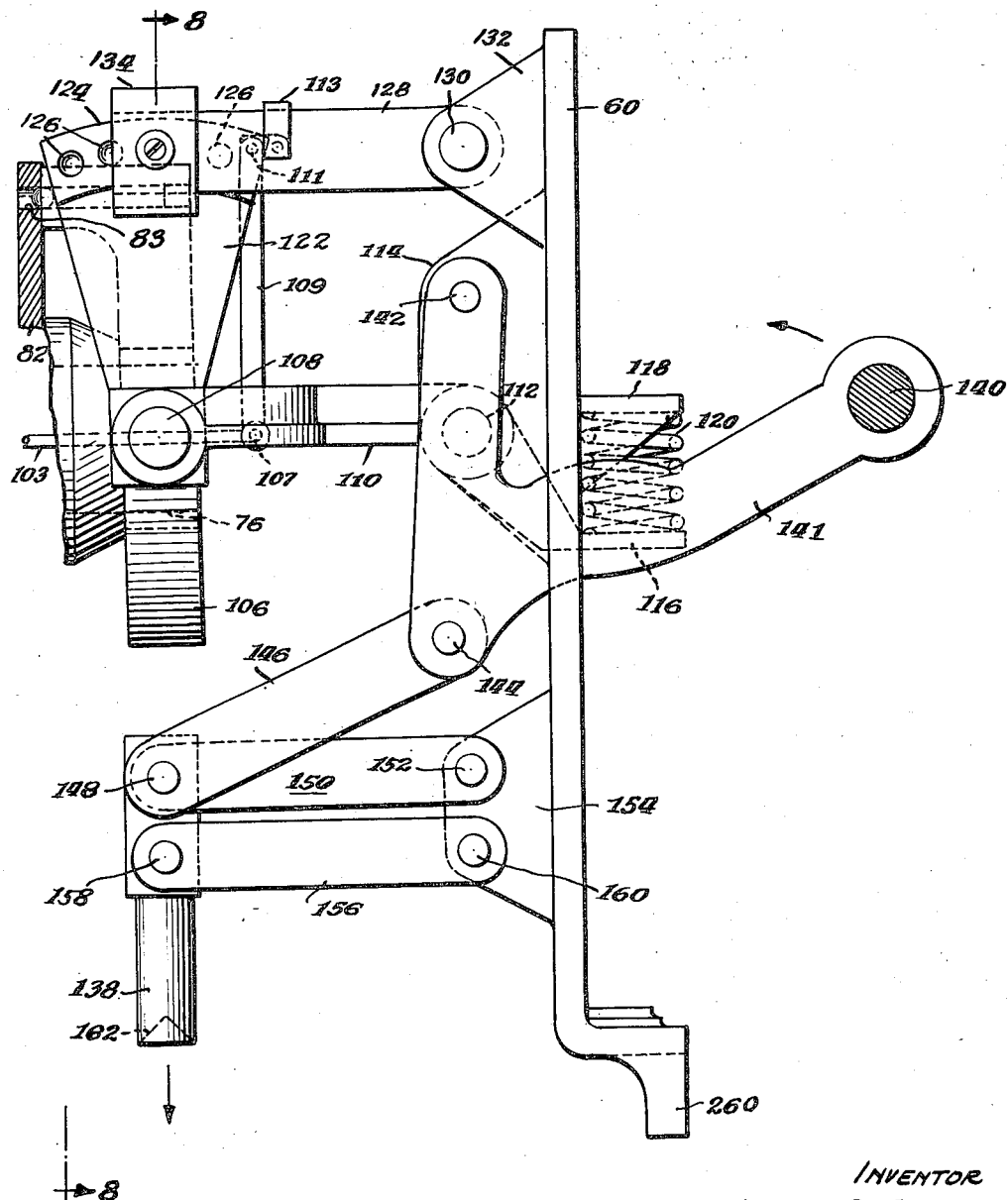

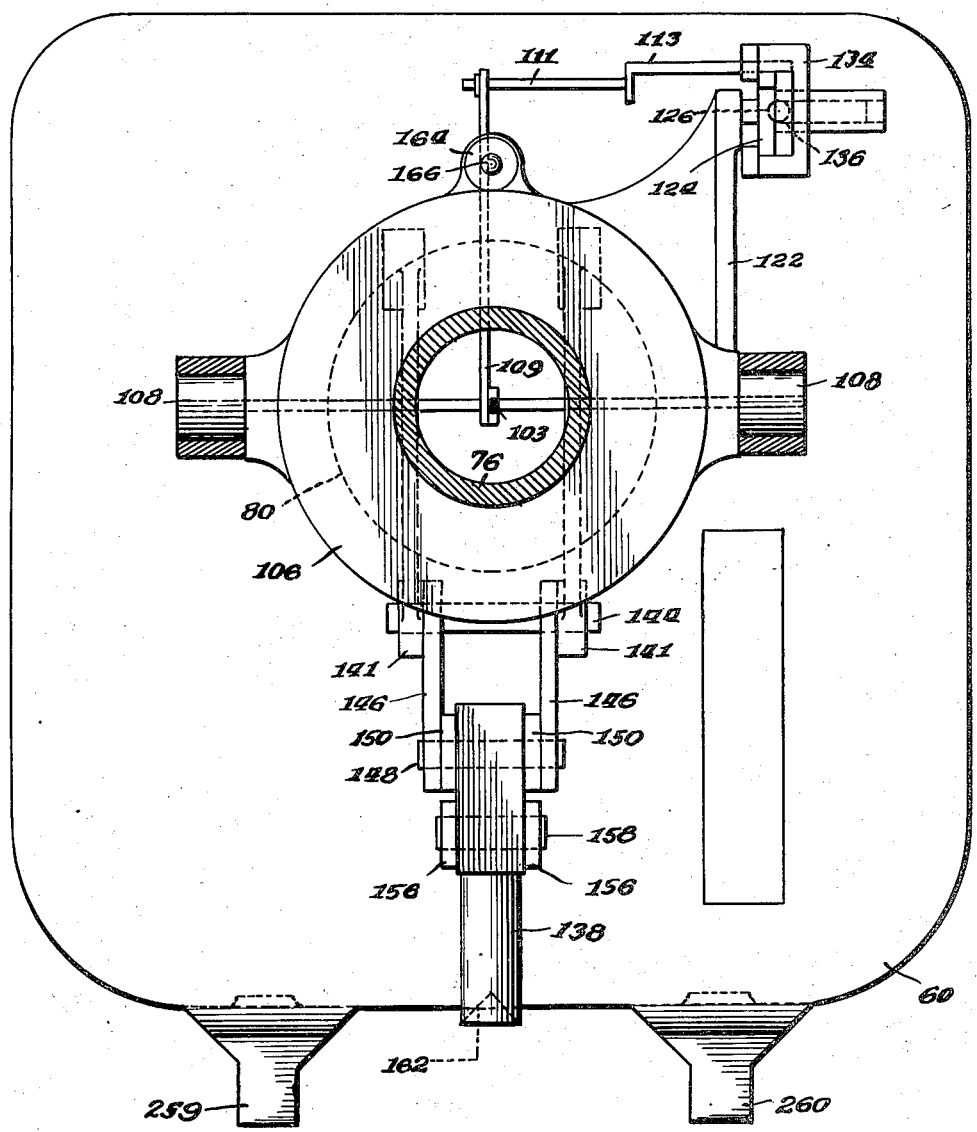

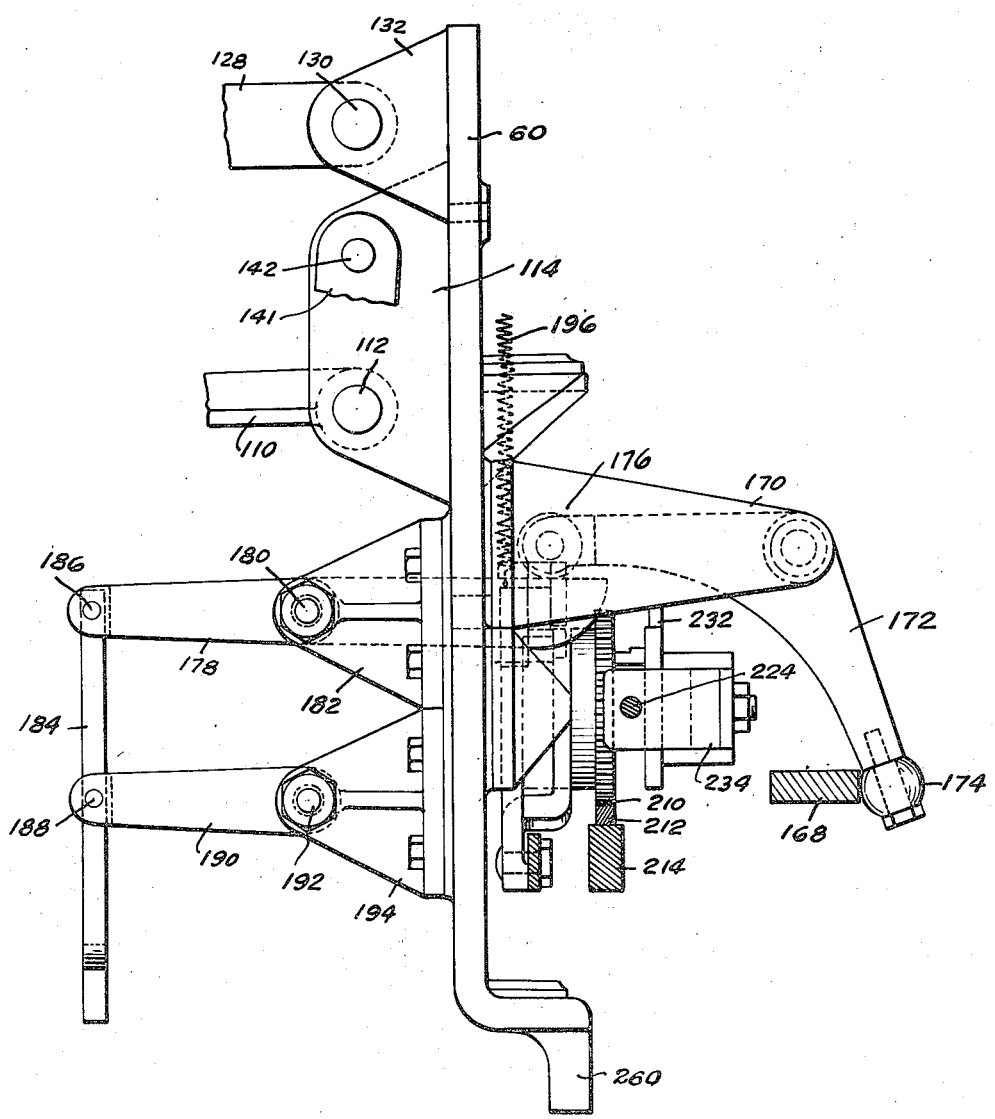

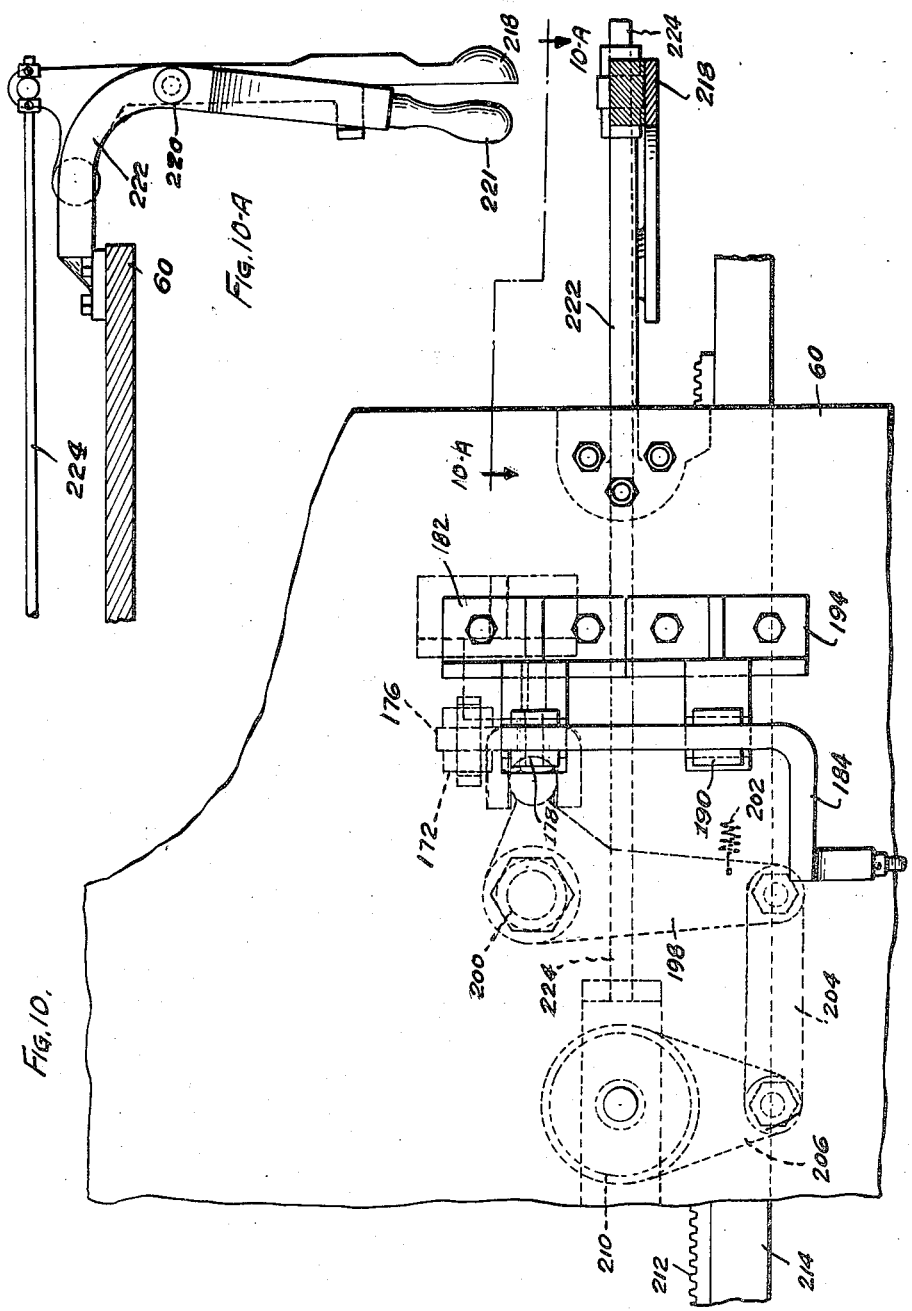

Feb. 13, 1951 L. A. STINSON 2,541,840
AUTOMATIC SHOW CARD PRINTING MACHINE
Filed March 23, 1948 18 Sheets-Sheet 12
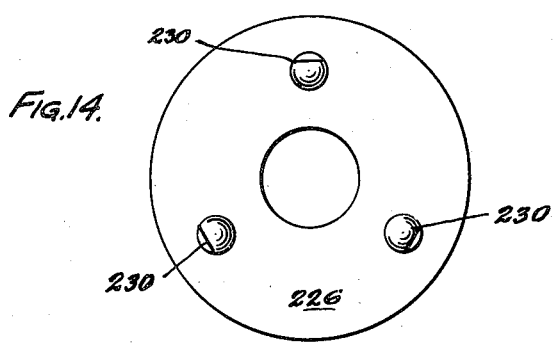
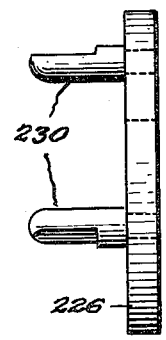
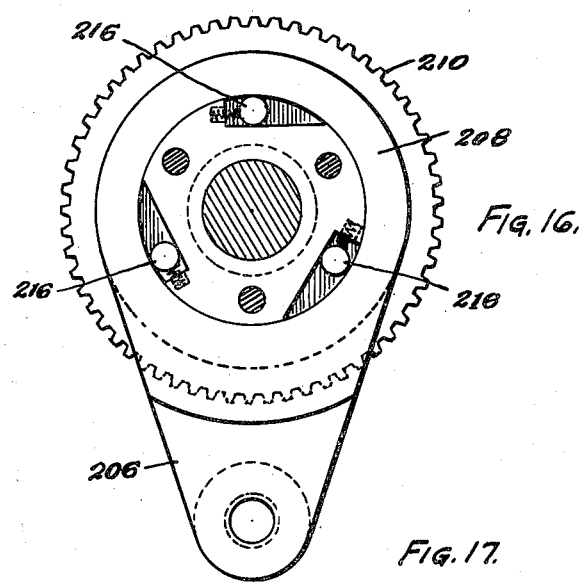
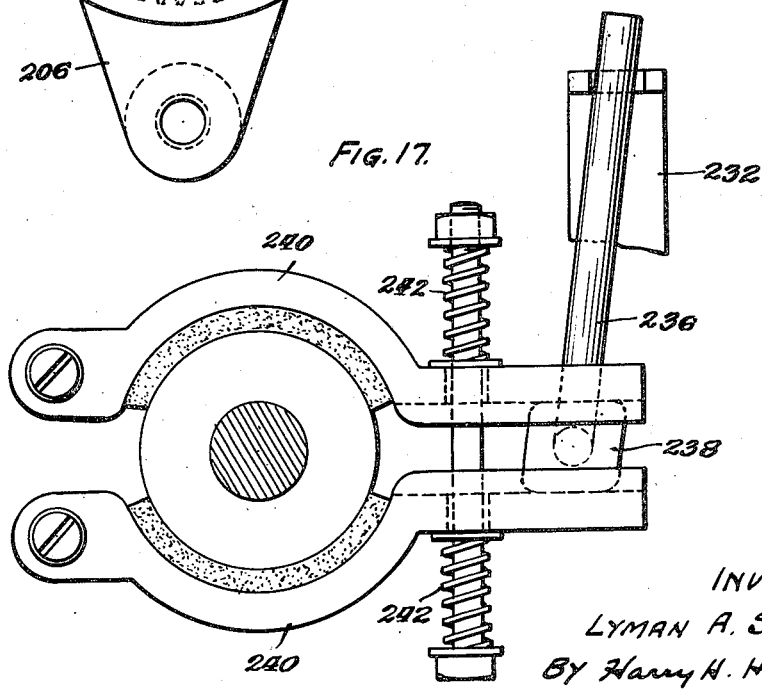
INVENTOR
LYMAN A. STINSON
BY Harry H. Hitzeman
ATTORNEY

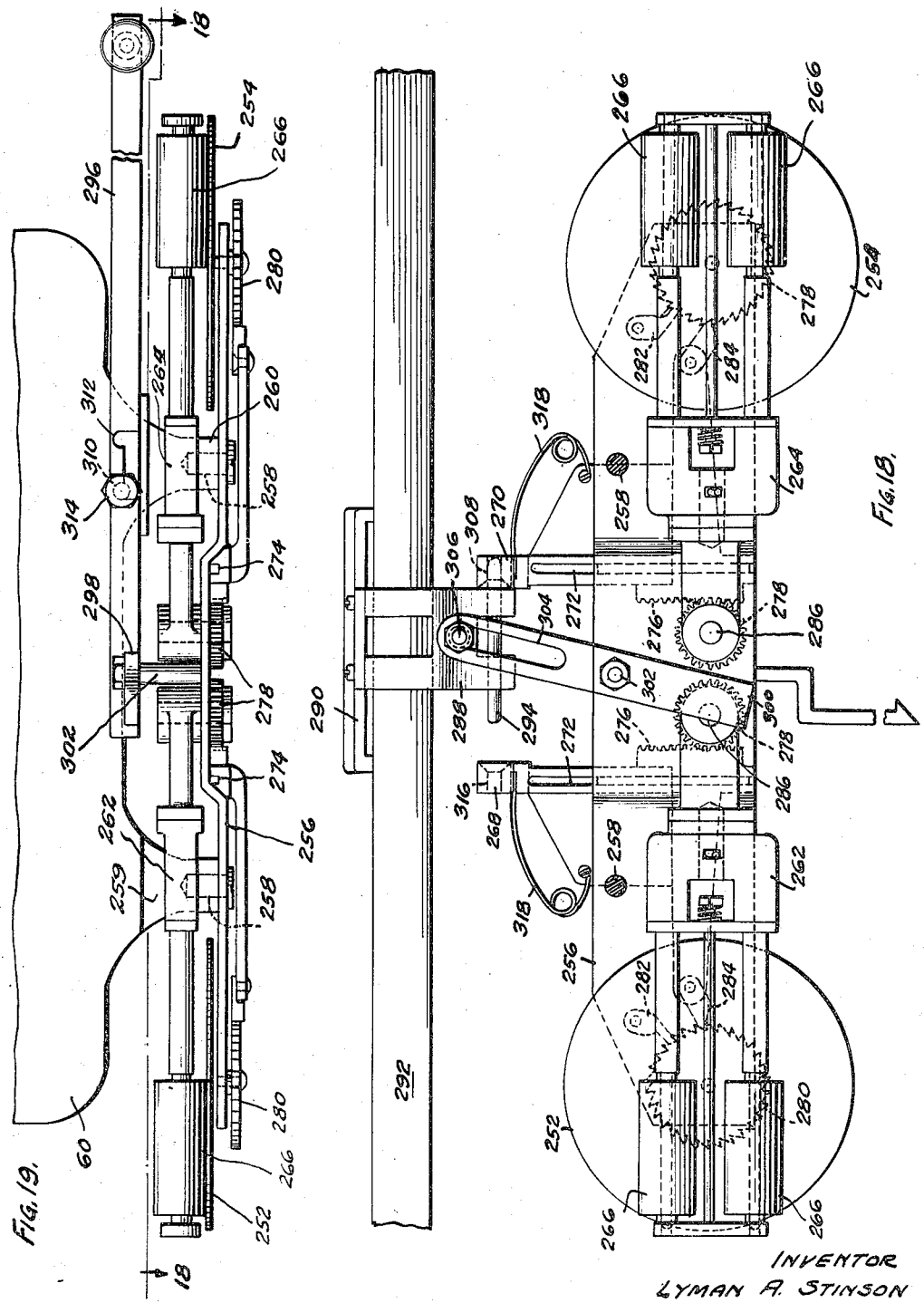

Feb. 13, 1951  L. A. STINSON  2,541,840
AUTOMATIC SHOW CARD PRINTING MACHINE
Filed March 23, 1948  18 Sheets-Sheet 14
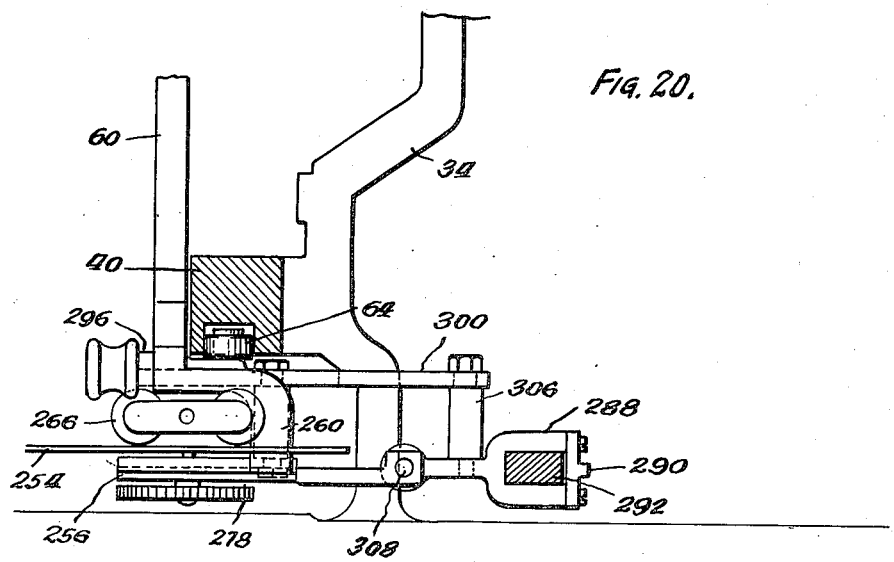
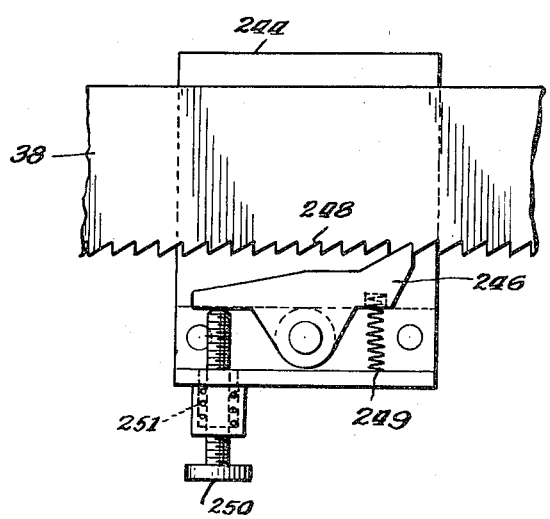 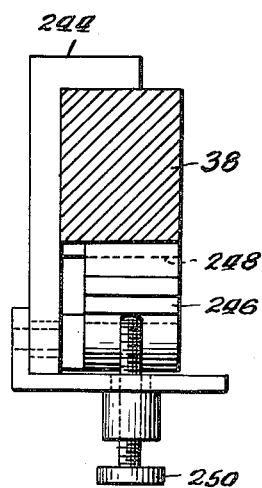
INVENTOR
LYMAN A. STINSON
BY Harry H. Hitzeman
ATTORNEY Feb. 13, 1951      L. A. STINSON      2,541,840
AUTOMATIC SHOW CARD PRINTING MACHINE Filed March 23, 1948      18 Sheets—Sheet 15

INVENTOR
LYMAN A. STINSON
By Harry H. Hitzeman
ATTORNEY.

Feb. 13, 1951 L. A. STINSON 2,541,840
AUTOMATIC SHOW CARD PRINTING MACHINE
Filed March 23, 1948 18 Sheets-Sheet 18

INVENTOR
LYMAN A. STINSON
By Harry H. Hitzeman
ATTORNEY.

Patented Feb. 13, 1951

2,541,840

UNITED STATES PATENT OFFICE 2,541,840

AUTOMATIC SHOW CARD PRINTING MACHINE

Lyman A. Stinson, Oak Park, Ill.

Application March 23, 1948, Serial No. 16,455

22 Claims. (Cl. 197—2)

My invention relates to automatic show card printing machines and to similar devices.

My invention relates more particularly to an automatic show card printing machine of the type which may be employed to print show cards, price tickets and similar signs, and is especially adapted for printing signs and cards from approximately 1" x 2" up to approximately 22" x 28", or single line streamers of any desired length.

The principal object of the present invention is to provide a completely automatic show card printing machine of the type described that is fast in action, simple to operate and one which the average layman can operate accurately and economically.

A further object of the invention is to provide a machine of the type described which carries a rotatable type drum, the type drum consisting of a plurality of segments, each segment being provided with a row of type of different size or style so that a wide selection of printing types may be obtained in a single machine.

A further object of the invention is to provide a machine of the type described in which the type drum is removable and replaceable so that by the provision of a plurality of type drums a great variety of styles of letters, numbers, etc. may be obtained, the type drum being easily and simply removable and replaceable.

A further object of the present invention is to provide in a machine of the type described mechanism for automatically spacing the letters so that whether a period (.), comma (,), "i" or a wide "M" or "W" is used, the spacing will be accurate and proper, and can never vary even though the machine has been in long and continuous use.

A further object of the invention is to provide simple yet positive operating mechanism for accomplishing the printing of a letter or symbol, one at a time, the only physical effort of the operator required being the turning of the drum to the desired letter or symbol and then the pressing of a button whereby the machine is actuated to print the letter or symbol and then automatically space to be ready for the next operation.

A further object of the present invention is to provide in a machine of the type described a type drum having a plurality of segments mounted about its periphery, the segments each carrying a row of letters or symbols which may be cast type and so constructed that individual type faces can be easily and quickly removed and replaced when they become damaged or worn.

A further object of the invention is to provide in a machine of the type described a comparatively simple yet absolutely accurate type positioning mechanism so that with each operation the letter or symbol desired will be accurately positioned so that the printing hammer will strike the same in an absolutely vertical downward pressure movement.

A further object of the invention is to provide in a machine of the type described an inking mechanism whereby more than one color may be printed if desired.

A further object of the invention is to provide an inking mechanism having more than one color or ink fountain which may be changed from one to the other color by the simple expedient of operating a small hand lever.

A further object of the invention is to provide a drum supporting carriage mounted upon parallel rails and capable of easy movement so that an ordinary office girl or similar person can easily return the carriage and type drum to starting position after one line has been printed.

A further object of the invention is to provide in connection with the type drum previously described a dial which has indicia thereon corresponding to the type faces on the segments, and an indicator or pointer cooperating therewith so that the operator will at all times know which letter or symbol is being printed.

Other objects and advantages will be more apparent from the following description wherein reference is had to the accompanying drawings, upon which:

Fig. 4 is a cross-sectional view through the machine taken generally on the line 4—4 of Fig. 2;

Fig. 5 is a plan sectional view taken generally on the line 5—5 of Fig. 2 showing the drive and associated parts;

Fig. 6 is a fragmentary cross-sectional view through the type drum, printing bed and carriage plate illustrating generally the drum detent for selecting the particular rows of type to be employed, the drum pivot and the pressure foot or hammer which operates to accomplish the actual printing;

Fig. 7 is an enlarged cross-sectional view of similar parts showing them in more detail;

Fig. 8 is a sectional view of the same parts taken generally on the line 8—8 of Fig. 7;

Fig. 9 is a similar fragmentary view showing the spacer assembly and operating bar therefor;

Fig. 10 is a fragmentary front view of the parts shown in Fig. 9 taken looking from the left of Fig. 9;

Figure 12:
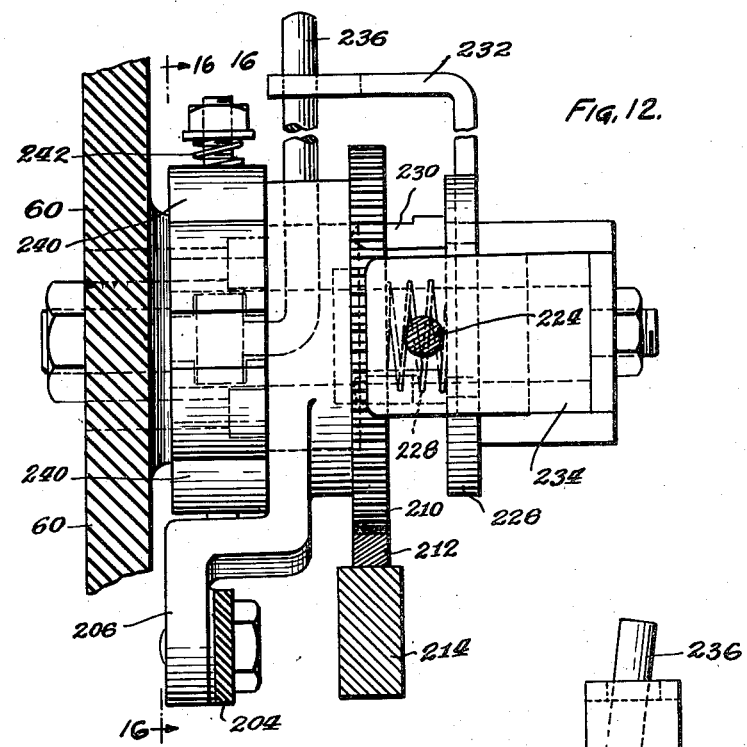
Figure 13:
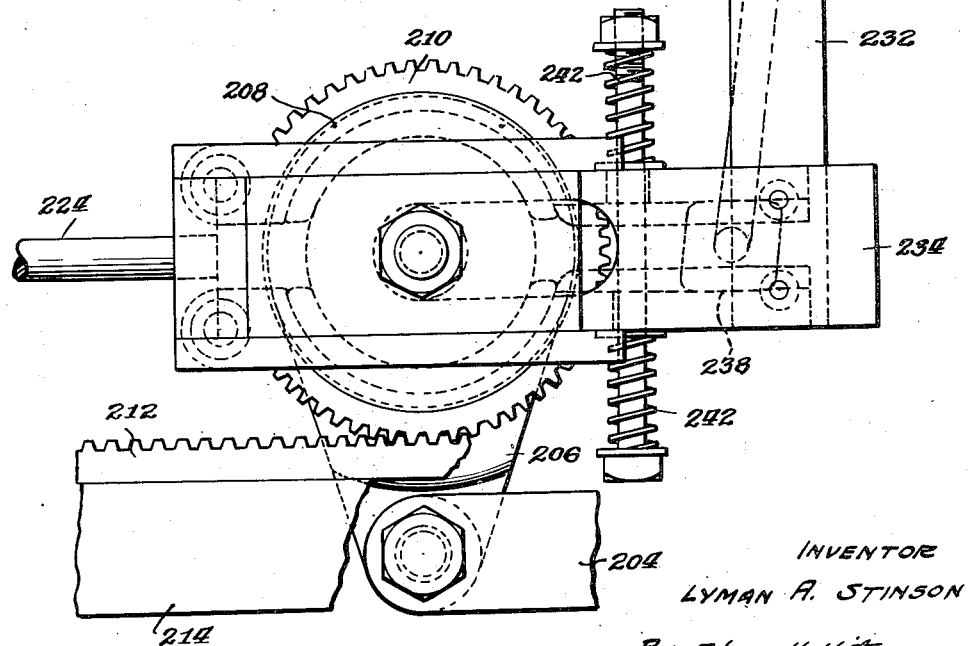
Figure 23:
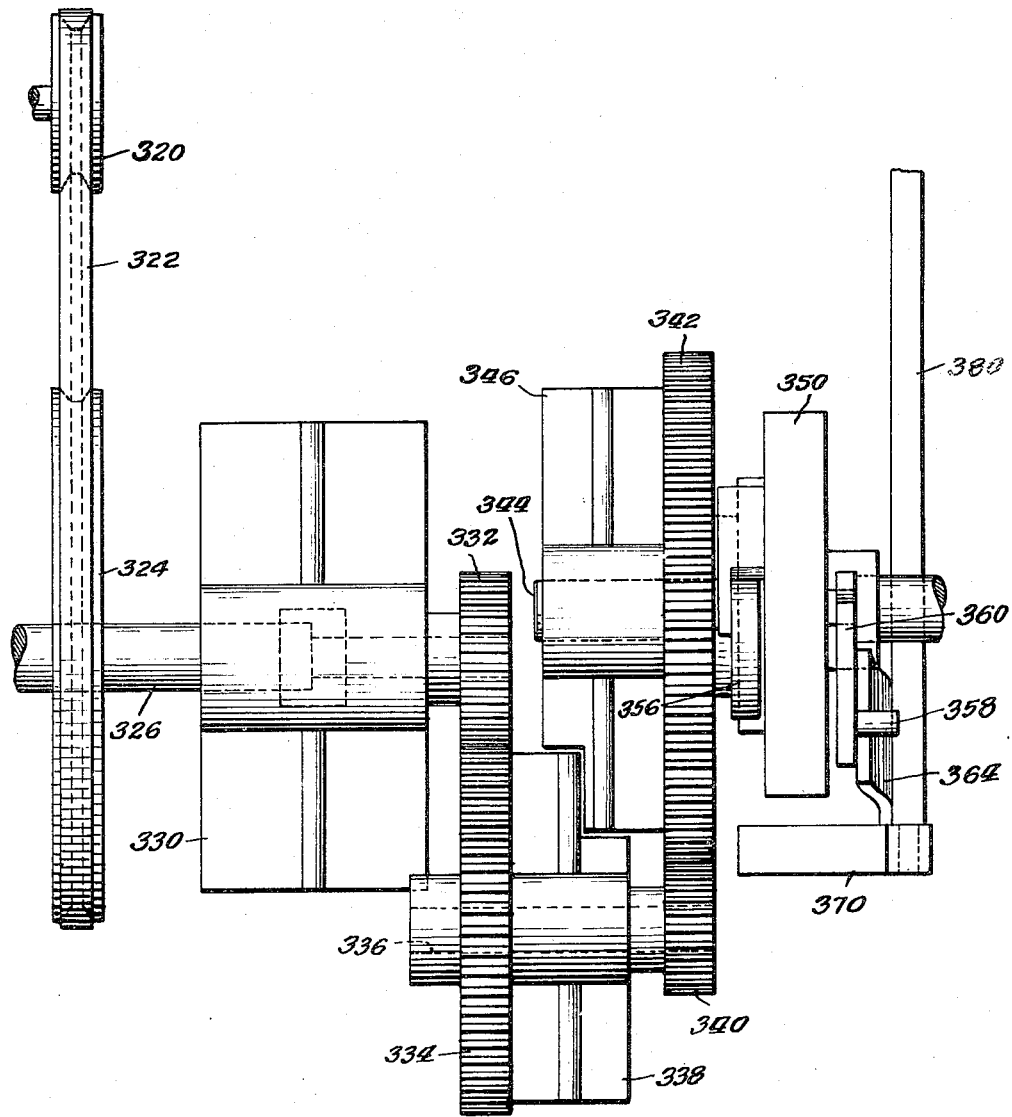
Figure 24:
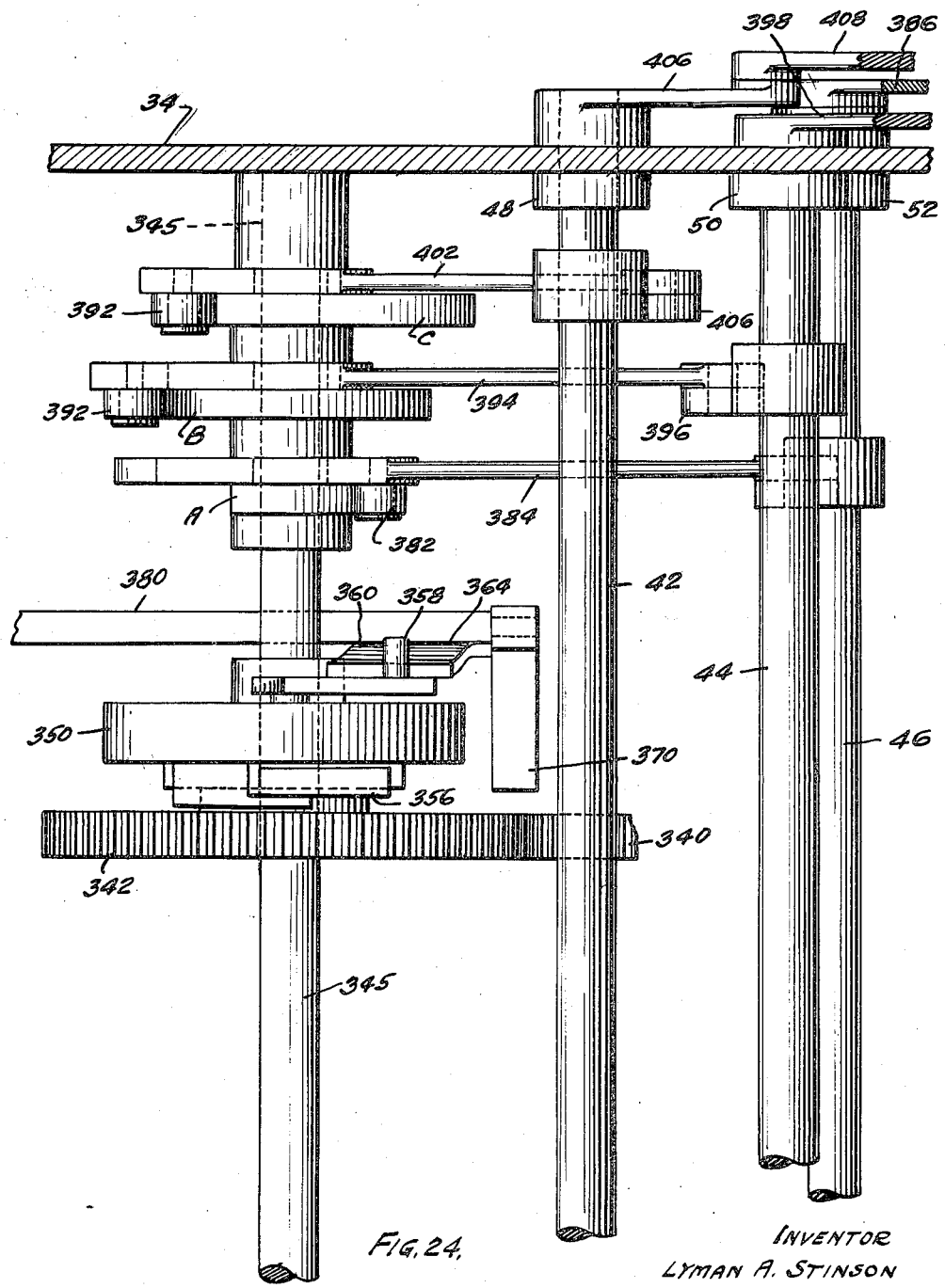
Figure 25:
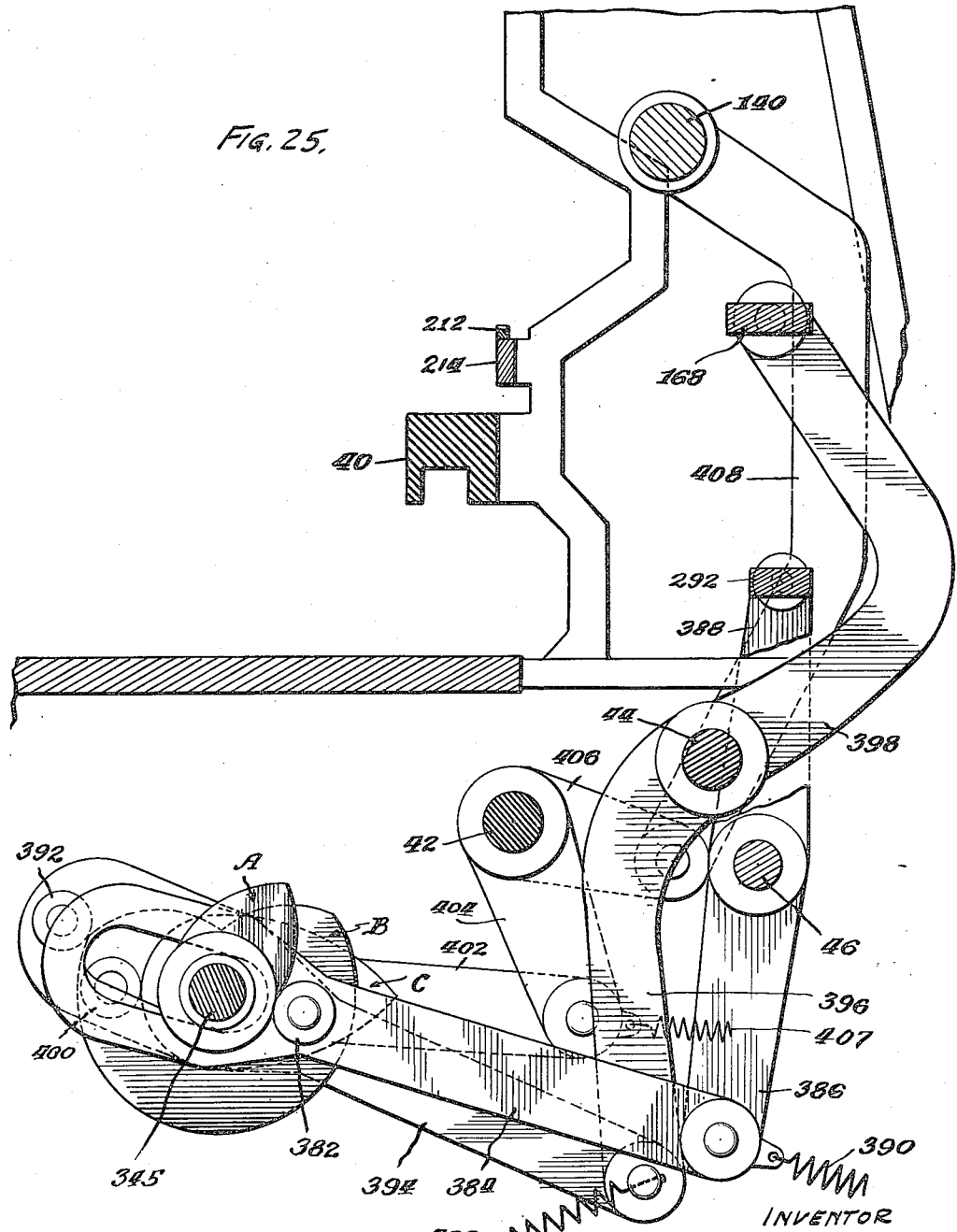
Figure 26:
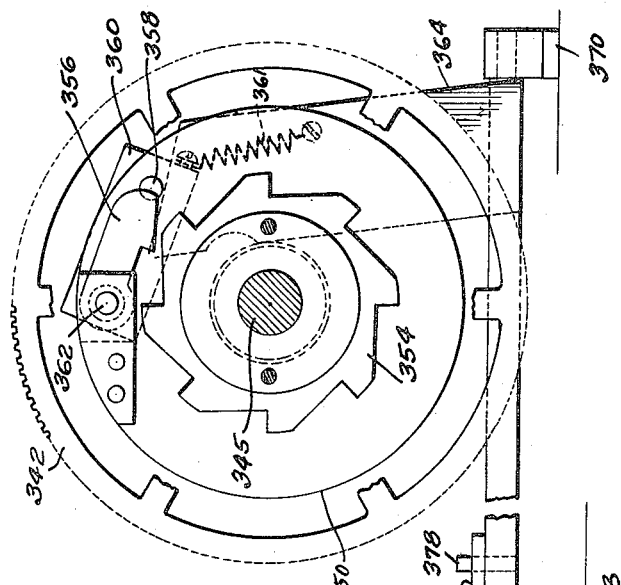
Figure 27:
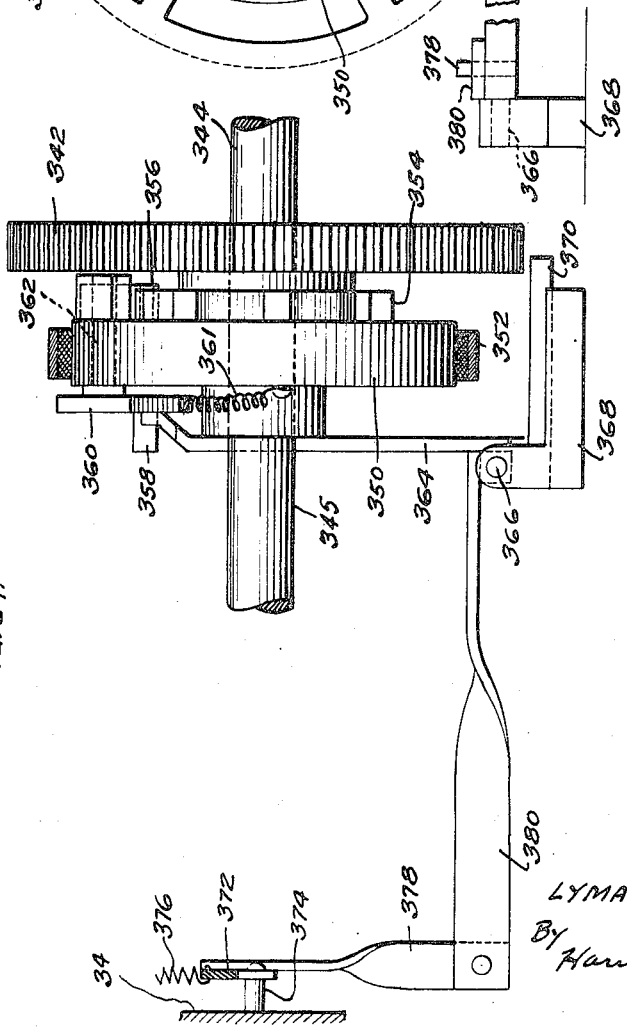

Fig. 10—A is a fragmentary plan sectional view taken generally on line 10—A—10—A of Fig. 10;

Fig. 11 is a fragmentary sectional view taken on the line 11—11 of Fig. 6 showing the mechanism for setting the detent to select the desired letter;

Fig. 12 is a fragmentary sectional view through the carriage and rack showing in side elevation the automatic clutch and brake for the spacing mechanism;

Fig. 13 is a side elevational view of the same parts, the view being taken from the right of Fig. 12;

Fig. 14 is a front view of the clutch release plate therefor;

Fig. 15 is a side elevational view of the same;

Fig. 16 is a cross-sectional view of the free-wheeling clutch parts taken generally on the line 16—16 of Fig. 12;

Fig. 17 is an end elevational view of the brake mechanism associated therewith;

Fig. 18 is an enlarged fragmentary plan view of the inking mechanism assembly and associated parts;

Fig. 19 is an enlarged fragmentary view of the same parts looking at them from the front;

Fig. 20 is a side elevational view of the same parts shown mounted upon the carriage, with parts broken away in section to more clearly show other parts;

Fig. 21 is a fragmentary front elevational view of the margin stop mechanism;

Fig. 22 is a side elevational view of the same;

Fig. 23 is an enlarged fragmentary plan view of the motor drive and associated parts;

Fig. 24 is a similar plan view of the cam members and associated parts driven from the main drive shaft;

Fig. 25 is a cross-sectional view thereof taken generally on the line 25—25 of Fig. 5;

Fig. 26 is a cross sectional view of the drive clutch assembly taken generally on the line 26—26 of Fig. 5; and Fig. 27 is a side elevational view of the same parts.

Figure 1:
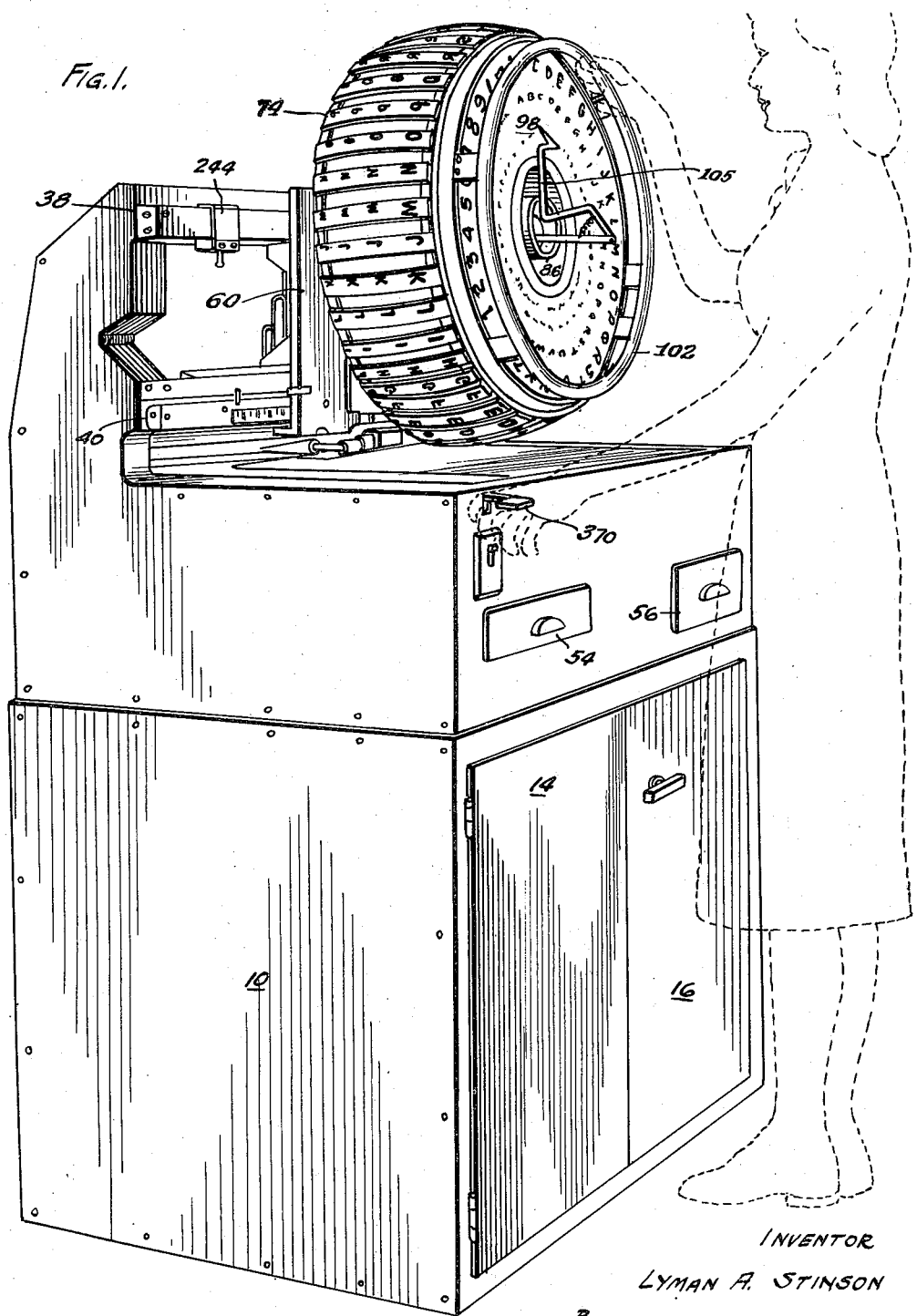
Fig. 1 is a front perspective view of the machine from the left showing the manner in which an operator stands at the front of the machine to operate the same.
Figure 2:
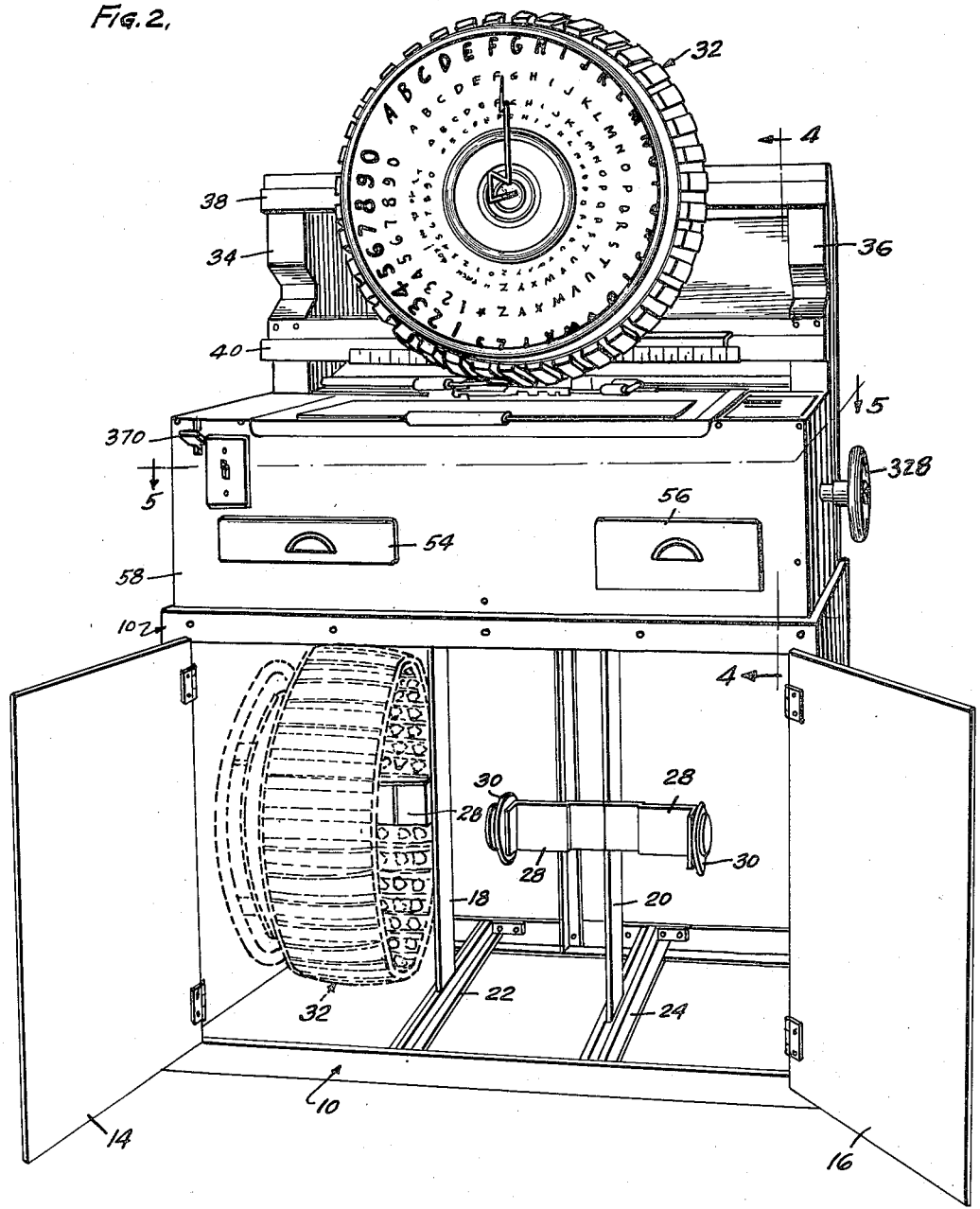
Fig. 2 is a generally front perspective view of the machine, the doors of the storage cabinet being open to show how several type drums may be disposed therein.

In the embodiment of the invention which I have chosen to illustrate and describe, I have shown in Fig. 1 the preferred form of construction wherein I provide a cabinet 10 upon which the base casting 12 may be mounted. The cabinet 10 as best shown in Fig. 2 may be provided with the swinging doors 14 and 16 and a pair of vertical racks 18 and 20. Each of the above mentioned racks is suitably mounted in upper and lower racks 22 and 24, so that the rack may be moved forward or back in the cabinet. Each of the racks carries one or more hinged brackets 26, the brackets each having a generally cylindrical hub 30 for the purpose of supporting additional type drums 32.

To the rear of and upon each side of the base casting 12, I provide vertical frame members 34 and 36, the frame members being rigidly connected to the base spider and to each other by the parallel rail members 38 and 40. In addition to the rigidity of this construction the three shaft members 42, 44 and 46 are journalled in suitable bosses 48, 50 and 52 in the web of the side frame members 34 and 36. Because of the disposition of the motor and drive mechanism on the base casting 12, I have provided tool drawers 54 and 56 in the cabinet 58 mounted above the base cabinet 10. The drum carriage may be generally in the form of a rectangular plate 60 which is provided with the supporting rollers 62 mounted on the back thereof and the guide rollers 64 adapted to ride in suitable parallel slots 66 and 68 in the rails 38 and 40.

The carriage plate 60 may have a hinged bracket 110 pivotally mounted upon a shaft 112 journalled in suitable brackets on the face of the plate. The bracket 110 serves as a mounting or support for the type drum 74, the drum having a hollow hub 76 which is mounted in a collar bracket 78, the hub being mounted in a ball bearing mounting 80 for easy rotation. A detent plate 82 is secured to the hub 76 riding in a circular opening 84 in the disc-like drum frame 86. The frame is mounted on the hub 76 and held in operative position by means of a locking nut 87, the locking nut being keyed to the hub in operative position by a set-screw 88.

The type drum 74, as previously described, may include the frame 86 and a plurality of type face carrying segments 90 equally spaced about the periphery of the same and fastened to the back of the frame 86 by screw members 92. A ring 94 may be fastened to the back end of each of the type carrying segments 90 by suitable set-screws 96. With this construction, including the disc-like frame 86, the ring 94 and the type carrying segments rigidly fastened between the same a sturdy, well-built type drum is formed.

Figure 3:
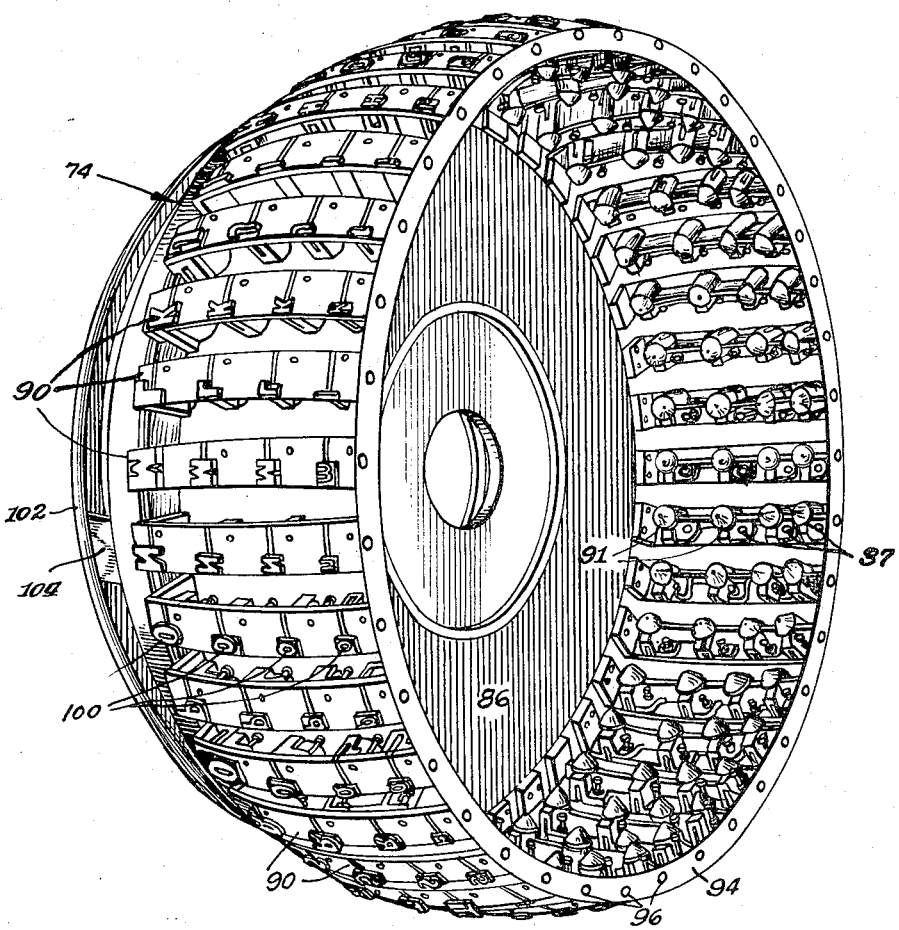
Fig. 3 is a perspective view of one of the type drums.

Indicia bearing means in the form of a circular plate 98 is mounted on the front of the frame 86, the plate 98 in the construction shown having four rows of letters, numerals or other frequently used characters such as periods, colons, commas, semi-colons, dollar signs, cents, dashes, quotes, percent signs, etc., it being noted that the size of the indicia corresponds to the size of the type faces 100 which are fastened in the segments 90. Thus, by comparing the type faces on the drum in Fig. 3 with the size of the indicia on the plate 98 in Fig. 2, it can be seen that the small letter "o," for example, is on a smaller circular row on the plate and the large letter "O" is in the largest circular row on the plate similar to the positioning of the type faces on the segment. For easy rotation and tilting of the drum 90 I have fastened an operating wheel 102 to the forward side of the drum, the wheel being supported by suitable brackets 104 from the circular frame 86.

In addition I have provided a pointer 105 which indicates both the character in printing position and the exact row of characters that will be printed. This pointer will operate along with the drum as it is moved to an angular position from the vertical to select the row of type faces to be employed, as will be presently described.

The mechanism for tilting the drum to a desired angular position so that the particular type face selected can be printed will now be described. The drum 74, as previously mentioned, is mounted for rotation upon a hub 76 in a ball bearing race 80 in a bracket 106. The bracket is provided with a pair of pivots 108 upon both sides of the same so that it may be conveniently supported in a hanger bracket 110.

The bracket 110 may be pivotally mounted upon a shaft 112 supported in a pair of brackets 114 upon the carriage plate 60. The bracket 110 may have a backward extension terminating in a platform 116 positioned below a platform 118 integrally formed with the carriage plate 60. A comparatively strong coil spring 120 may be positioned between these two platforms, the spring being of sufficient strength to normally hold the drum in an upright or inoperative position.

The bracket 106 may have an upwardly extending arm 122 which carries at its upper end and spaced away from the same an arcuate plate 124. The plate has a plurality of conically shaped depressions 126 in the face thereof. I provide a link 128 mounted upon a shaft 130 that is pivotally mounted in the bracket 132 on the face of the carriage plate, the link extending forward and carrying a block 134 within which a spring pressed ball 136 is mounted, the ball being in alignment with the conically shaped depressions 126 in the plate 124. Thus, by manually tilting the drum 32 forward or back, any one of the rows of type face previously mentioned can be aligned directly below the pressure bar or hammer 138 for a printing operation.

A printing operation takes places when the particular type face which it is desired to print has been brought into alignment with the hammer and the operation of the machine is started. A printing pressure bar or rod 140 carries a bifurcated bracket 141 which has its upper ends mounted upon a pivot 142, and has a lower pivot 144 for a pair of link members 146. These links are pivotally connected to a pin 148 which extends through the head of the pressure bar or hammer 138. A pair of links 150 are mounted on the same pin 148 and also pivotally connected to a shaft 152 mounted in a bracket 154 on the face of the carriage plate. A second pair of links 156 are pivotally mounted upon a second pin 158 in the head of the pressure bar or hammer, the other end of the links being pivotally mounted upon a shaft 160 that is also mounted in the bracket 154. As the printing pressure bar or rod 140 moves forward in an arcuate direction about the pivot 142, through the linkage with the bifurcated lever 141 the hammer 138 will be forced downward, the parallelogram pivoting of the same insuring a direct perpendicular movement of the hammer head, the conical opening 162 in the same coming down in a direct perpendicular line upon one of the conical heads 91 of the type segments 90, thus insuring a positive flat printing operation on the show card that has been placed on the printing bed 9 below the segment for printing.

In connection with the angular tilting of the printing drum, I have provided a similar parallelogram support for the indicator 105, the arm 103 extending out beyond the front of the drum and being pivotally connected to the indicator 105. The arm 103 is mounted on a cross-rod 107 in the U-bracket 110 and connected by a link 109 to a similar cross-rod 111 that is carried by a bracket 113 mounted upon the link 128. In this way, as the drum which carries the type segments is forced down in a perpendicular direction to the printing bed, the indicator will automatically assume the same direction, due to the parallelogram linkage of the same.

The detent mechanism for holding the drum in a fixed position against rotation may include a forwardly extending boss 164 on the bracket 106, the boss having a spring pressed ball 166 therein adapted to seat in any one of the openings 83 in the plate 82 on the hub 76. In this manner the drum can be easily turned against the spring pressed ball, yet will be positively held in any fixed position aligning a particular letter or character on the type segment for printing purposes.

In a machine of this kind where type faces of different sizes are employed, it is quite important that the spacing between letters be done according to the size type being used. Accordingly I have provided automatic spacing mechanism which spaces for the letters in direct proportion to the size of the type face.

As shown in Figs. 9 and 10, I have provided a space pressure bar 168 which is operated as will be presently described to move back and forth in a generally horizontal line. A bracket 170 on the back of carriage plate 60 pivotally supports a lever 172 which carries a roller 174 bearing against the bar 168 and a second roller 176 that rides on the top of a pivoted lever arm 178, the arm being pivoted upon a bolt 180 mounted in suitable brackets 182 on the front of carriage plate 60. A spacing bar 184 is pivotally connected by a pin 186 to the end of the lever arm 178 and is also pivotally connected by a pin 188 to a link 190 pivotally mounted upon the bolt 192 carried by a bracket 194 mounted on the face of the carriage plate.

As can be seen, I have again provided a parallelogram linkage so that the spacing bar in its downward movement will move parallel to the pressure bar or hammer, and perpendicular to the face of the printing bed. In the operation of the machine, when a printing operation takes place, the space pressure bar 168 moves forward or to the left, Fig. 9. When this action takes place, the roller 174 falls and permits the lever 178 to be tilted, moving the right end of the same upwardly under the action of spring 196.

This operates a lever 198 mounted upon a pivot 200 on the back of the carriage plate. A spring 202 normally assists in this action. One of the arms of the lever 198 may be pivotally connected to a link 204 that is pivotally connected to the leg 206 of clutch housing 208. A gear 210, which is fixedly secured to the housing rides upon the rack 212 which is supported by a cross bar 214 that extends between the two side frames of the machine. As the leg 206 of the housing is swung to the right, the gear 210 will be rotated by means of the clutch pins 216, thus moving the carriage forward on the rack 212 a definite distance. This distance, which is the space required and determined by the size of type face being printed, depends for its accuracy upon the position of the set screws 37 that are mounted on the type segments 90 adjacent the type faces positioned therein.

For example, as shown in Fig. 6, the smaller the type face, the less downward movement of the spacer bar 184, for a reason which will be presently apparent. As the printing operation is completed and the space pressure bar moves to the right, Fig. 9, it bears against roller 174 and by means of lever 172, roller 176, lever 198 and link 204, the carriage will be moved forward in direct proportion to the distance that the spacing bar 184 has traveled down. It will thus be clear that the roller 174 does not always follow the space pressure bar to the left to its extreme movement, the roller 174 stopping in accordance with the distance that the spacing bar 184 travels.

For returning the carriage to starting position I have provided (see Fig. 10-A and Figs. 12 to 17 inclusive) a manual release which may include a lever 218 which is pivotally mounted upon a bolt 220 supported by a bracket 222 fixedly secured to the back of the carriage plate 60. The lever 218 is moved to the left, Fig. 10—A, to pull on the link 224 which is connected at one end to a cam member which operates to press the roller release plate 226 forward against a spring 228, the plate 226 carrying pin members 230 which move into the clutch member to move the rollers 216 counterclockwise to release the clutch. At the same time, an L-shaped arm 232 carried by the movable clutch part 234 actuates a pin 236 that carries a cam block 238 between the two segments 240 of a friction brake. As the cam is rotated it operates against the springs 242 to open the boss of the brake member, and the overriding clutch now being released and the brake being released, the carriage can be moved to the right or to the left by right or left pressure upon the handle 218.

From the above description it can be seen that by the use of the clutch and brake mechanism which I have provided, together with the spacer bar action, the spacing for the size letters or characters required is always automatically and accurately accomplished. In addition, when it is desired to return the carriage to the margin stop, this is accomplished by grasping the lever 218 and the handle 221 of the bracket 222, releasing the brake and clutch by means of the link 224, and the carriage can be moved to the right or left to any desired distance.

The margin stop which has just been mentioned and which is most clearly shown in Figs. 1, 21 and 22, may comprise an L-shaped bracket 244 which rides upon the upper rail 38 between the side frame members. The L-shaped bracket may carry a dog member 246 which cooperates with the teeth members 248 on the lower side of rail 38. The dog is normally held in engagement with the teeth 248 by means of a spring member 249. The opposite end of the dog, however, may be moved upwardly by pressure on the button 250 which is normally held in lowermost position by a spring member 251. Thus the margin stop may be moved about in accordance with the operator's desires whenever required.

As previously mentioned in the objects of the invention, applicant has provided means for printing in a plurality of colors. To carry this out I have provided inking mechanism which may include a pair of ink carrying discs of two different colors, discs 252 and 254, that are mounted for rotation on a plate 256 which is carried by a pair of bolt members 258 from the bottom of the carriage plate 60, the plate having downwardly depending lug members 259 and 260 for supporting the same. I provide a pair of inking roll holders 262 and 264 which carry conventional inking rollers 266. Each of the ink roll holders may be provided with a bracket 268 and 270 respectively; each bracket has a track 272 which engages a bar 274 secured to the lower side of the plate 256. Each of the brackets carries a rack 276 in engagement with a gear 278 rotatably mounted beneath the plate 256.

Each of the inking discs 252 and 254 is provided beneath the plate 256 with a ratchet 280. Each ratchet is provided with suitable latch members 282 and 284 for permitting rotation of the ratchet and disc in only one direction.

Means for operating the ink rollers to swing out and wipe ink on the type face may include the brackets 262 and 264, each fastened to a suitable pivot 286. I also provide a bracket 288 fastened by means of the plate 290 to the printing roll operating bar 292. During the operation of the drive, as will presently be described, and in timed sequence, the bar 292 will be moved forward. As it is moved forward it carries with it by means of the pin 294 either one of the brackets 272, depending upon the position of the color change actuating lever 296. This lever has a slot 298 therein which engages the bar 300 adjacent its outer end, the bar having a pivot 302 on the plate 256 and having an elongated slot 304 within which the bolt 306 may travel. If the pin 294 is engaged in the opening 308 of the right bracket as shown in Fig. 18, and the printing roll operating bar 292 is moved forward, the rack 276 engaging the pinion 278 will swing the inking rollers 266 outwardly and ink the type face that is in position for printing.

In the event a different color is desired, the color change actuating lever 296 may be moved from the position in which its slot 310 is engaged with a bolt 314 on the face of the carriage plate to a position in which its slot 312 is engaged therewith, this movement serving to swing the bar 300 about its pivot 302 counter-clockwise, thereby engaging the pin 294 in the opening 316 of the left bracket 272. In this position the same operation will take place except that the left printing rolls 266 will wipe ink from the plate 252 and ink the type faces with a different color ink. Grasshopper springs 318 connected between a portion of the plate 256 and the brackets 272 normally assist in returning the inking rolls to normal position.

The drive mechanism which operates all of the mechanisms which have been previously described may consist of a source of power such as an electric motor M mounted upon a portion of the base and connected by means of a V-belt drive pulley 320 and a V-belt 322 with a pulley 324 mounted on the main drive shaft 326.

The shaft 326 may carry at its outer end a fly-wheel or hand wheel 328 by means of which the mechanism of the entire machine may be slowly manually worked whenever desired. This shaft may be journalled in a frame and in a suitable bearing 330 mounted on the base, the shaft carrying at its end a pinion 332 which engages a gear wheel 334. The gear 334 may be keyed to a shaft 336 mounted in a suitable bracket 338 and have a pinion 340 keyed thereto at its opposite end. The pinion 340 engages a face gear 342 keyed to drive shaft 344, mounted in suitable bearings 346 and 348.

I provide a brake and clutch mechanism associated with this shaft (see Figs. 26 and 27). This may include a disc 350 rotatably mounted upon the shaft, the disc having a brake 352 normally holding the same against movement. Upon one side of the disc 350 I mount a toothed ratchet 354 keyed to the cam shaft 345 for normal rotation therewith. I mount a dog 356 upon one side of the disc 350, the dog normally being held out of engagement with the ratchet by means of pin member 358 secured to a plate 360 rigidly connected to the pivot 362 upon which the dog 356 is mounted. When the pin is released, permitting the dog to drop into the path of the teeth of the ratchet 354, the cam shaft 345 will be rotated by means of the continuously running motor previously described, and the drive between the same and shaft 344. The pin and plate 360 are returned to normal position by the spring 361 connected between the end of plate 360 and disc 350 whenever the cam plate 364, which is mounted upon a pivot 366 is swung in a clockwise direction. The pivot 366 is mounted in suitable brackets 368 and 370 mounted upon the base of the machine.

Means for operating this cam plate to release and operate the clutch just described is the button 370 on the front of the machine upon which the operator shown in dotted lines has placed her hand. This button is at the end of a pivoted arm 372 which extends inside of the housing of the frame and is mounted therein on a pivot 374, a spring 376 normally tending to hold the button in its uppermost position or in a position in which the clutch is disengaged. The operating arm 372 carries a downwardly depending arm 378 pivotally connected to an arm 380 that is secured to the plate 364. Thus, whenever there is any downward pressure on the button 370, the cam plate 364 will be swung outwardly (see Fig. 27), releasing the plate 360 and pin 358, whereby the dog 356 will engage the ratchet 354 to operate the cam shaft 345. Since the spring 376 will draw the cam plate back into position to raise the dog at the end of one revolution, and since the brake 352 is continuously operating, it can be seen that the operation of the machine is instantly stopped after one complete revolution of the cam shaft.

The cam shaft 345 carries the three cam members A, B and C. The cam A operates the printing ink roll operating bar 292; the cam B operates the spacer bar 168 and the cam C operates the pressure bar 140.

The cam A actuates the printing roll operating bar by means of a follower roller 382 mounted upon an arm 384 connected to the arm 386 that is keyed to the shaft 46. The shaft 46 carries at its extensions and within the side frames 34 and 36 a pair of arms 388 between which the printing roll operating bar 292 is connected. A spring member 390 normally tends to hold the roller 382 against the cam.

The cam B operates upon follower roller 392 mounted upon the arm 394 which is connected to an arm 396 keyed to the shaft 44. The shaft 44 carries at its outer ends in the side frame members a pair of arm members 398 between which the spacer bar 168 is connected.

The cam C has the cam follower roller 400 mounted upon a suitable arm 402 pivotally connected to an arm 404 keyed to the shaft 42. The shaft 42 has a pair of arms 406 keyed to the ends of the same within the side frames 34 and 36. Each of these arms is connected to an upright bracket 408 which have connected between them the pressure bar 140. The arms 394 and 402 are provided with return spring members 409 and 407 to assist in maintaining the rollers against the cams.

The cams are so arranged upon the cam shaft that when the button 370 is pushed and the clutch previously described is engaged upon one rotation of the cam shaft the printing roll operating bar will move forward, causing the type face to be inked. The pressure bar will then move forward to actuate the hammer to engage the back of the type segment to effect a printing operation, and in sequence the spacer bar will operate to move the carriage the proper space in accord with the size of the letter printed.

As thus described it can be seen that I have provided a show card printing machine which is practically fool-proof in that the operation of the printing and the spacing is automatic once the row of type and the particular character have been selected and the operating button has been pushed.

From the description it can be seen that the spacing for the characters will automatically take place after the printing operation, and will depend entirely upon the size of the type face that has been struck for the printing operation.

The automatic clutch and brake which normally moves forward and spaces as characters are printed, is easily operable manually to release the same for a return of the carriage. The margin stop can of course be set in any desired position in a manner similar to that which is done on a typewriter. The selection of the desired color of ink is accomplished by a simple movement of a small operating lever which acts to effect the inking of the type face by a different color ink whenever it is operated.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. Apparatus for printing show cards comprising a base, a pair of upright frame members connected to the sides thereof, parallel track members connecting said side frame members, a printing bed mounted on said base, a movable carriage mounted on said track members, a vertically positioned rotatable type carrying drum mounted on said carriage, means for positioning said drum with a desired type face above said printing bed, and means for moving said drum downwardly in a printing operation.

2. Apparatus for printing show cards comprising a base, a pair of upright frame members connected to the sides thereof, parallel track members connecting said side frame members, a printing bed mounted on said base, a movable carriage mounted on said track members, a vertically positioned rotatable type carrying drum mounted on said carriage, means for positioning said drum with a desired type face above said printing bed, means for angularly tilting said drum to bring a desired row of type faces into printing position, and means for moving said drum downwardly in a printing operation.

3. Apparatus for printing show cards comprising a base, a pair of upright frame members connected to the sides thereof, parallel track members connecting said side frame members, a printing bed mounted on said base, a movable carriage mounted on said track members, spacer means associated therewith, a vertically positioned rotatable type carrying drum mounted on said carriage, means for positioning said drum with a desired type face above said printing bed, and means for moving said drum downwardly in a printing operation.

4. Apparatus for printing show cards comprising a base, a pair of upright frame members connected to the sides thereof, parallel track members connecting said side frame members, a printing bed mounted on said base, a movable carriage mounted on said track members, spacer means associated therewith, a vertically positioned rotatable type carrying drum mounted on said carriage, detent means for holding said drum against rotation, means for positioning said drum with a desired type face above said printing bed, and means for moving said drum downwardly in a printing operation.

5. Apparatus for printing show cards comprising a base, a pair of upright frame members connected to the sides thereof, parallel track members connecting said side frame members, a printing bed mounted on said base, a movable carriage mounted on said track members, spacer means associated therewith, a vertically positioned rotatable type carrying drum mounted on said carriage, detent means for holding said drum against rotation, means for positioning said drum with a desired type face above said printing bed, means for moving said drum downwardly in a printing operation, and means for indicating which type face is being printed.

6. Apparatus of the type described comprising a base, a pair of upright frame members connected to two sides of said base, a printing bed mounted on said base, a pair of parallel rails connecting said side frame members, a carriage movable on said rails, a type drum mounted on said carriage, type faces positioned about the periphery of said drum and inking mechanism adjacent the lower end of said drum.

7. Apparatus of the type described comprising a base, a pair of upright frame members connected to two sides of said base, a printing bed mounted on said base, a pair of parallel rails connecting said side frame members, a carriage movable on said rails, a type drum mounted on said carriage, type faces positioned about the periphery of said drum and inking mechanism adjacent the lower end of said drum, said inking mechanism having two different colors of ink and means for selecting either color.

8. Apparatus of the type described comprising a base, a pair of upright frame members connected to two sides of said base, a printing bed mounted on said base, a pair of parallel rails connecting said side frame members, a carriage movable on said rails, a type drum mounted on said carriage, annular rows of type faces positioned about the periphery of said drum and inking mechanism adjacent the lower end of said drum, said drum capable of angular adjustment and rotation respectively to bring any desired row of type faces and an individual type face into printing position.

9. Apparatus of the type described comprising a base, a pair of upright frame members connected to two sides of said base, a printing bed mounted on said base, a pair of parallel rails connecting said side frame members, a space bar arranged between said rails, a carriage movable on said rails, a type drum mounted on said carriage, type faces positioned about the periphery of said drum, inking mechanism adjacent the lower end of said drum and space mechanism operable by said space bar and associated with said type drum for moving the same.

10. Apparatus of the type described comprising a base, a pair of upright frame members connected to two sides of said base, a printing bed mounted on said base, a pair of parallel rails connecting said side frame members, a space bar arranged between said rails, a carriage movable on said rails, a type drum mounted on said carriage, type faces positioned about the periphery of said drum, inking mechanism adjacent the lower end of said drum and space mechanism operable by said space bar and associated with said type drum, said space mechanism capable of moving said drum for variable spacing depending on the size of type face being used.

11. Apparatus of the type described comprising a base, a pair of upright frame members connected to two sides of said base, a printing bed mounted on said base, a pair of parallel rails connecting said side frame members, a carriage movable on said rails, a type drum mounted on said carriage, type faces positioned about the periphery of said drum and inking mechanism adjacent the lower end of said drum and automatic variable spacing means associated with said drum.

12. A type drum for an automatic show card printing machine having a hub, a disc-like frame member, a plurality of type face carrying segments attached to said frame member about its periphery, a ring connecting the ends of all of said segments, a plurality of type faces mounted upon each segment and an indicator disc positioned on the front of said disc-like frame member.

13. A type drum for an automatic show card printing machine having a hub, a disc-like frame member, a plurality of type face carrying segments attached to said frame member about its periphery, a ring connecting the ends of all of said segments, a plurality of type faces mounted upon each segment, an indicator disc positioned on the front of said disc frame member and a spring pressed detent associated with said drum for holding said drum in printing position.

14. In a machine of the class described having a printing bed, a rotatable drum mounted above said printing bed, said drum having a plurality of type face carrying segments equally spaced about its periphery, a carriage for supporting said drum, detent means for accurately positioning any selected type face carrying segment in a printing position and automatically operated spacer means for spacing for the next printing operation in direct proportion to the size type being printed.

15. In a machine of the class described having a printing bed, a rotatable drum mounted above said printing bed, said drum having a plurality of type face carrying segments equally spaced about its periphery, a carriage for supporting said drum, rails for supporting said carriage, detent means for accurately positioning any selected type face carrying segment in a printing position and automatically operated spacer means for spacing for the next printing operation in direct proportion to the size type being printed.

16. In a machine of the class described having a printing bed, a rotatable drum mounted above said printing bed, said drum having a plurality of type face carrying segments equally spaced about its periphery, a carriage for supporting said drum, rails for supporting said carriage, detent means for accurately positioning any selected type face carrying segment in a printing position and automatically operated spacer means for spacing for the next printing operation in direct proportion to the size type being printed, said spacer means including adjustable stop members on each type face carrying segment, one for each type face.

17. In a machine of the class described having a printing bed, a rotatable drum mounted above said printing bed, said drum having a plurality of type face carrying segments equally spaced about its periphery, a carriage for supporting said drum, rails for supporting said carriage, detent means for accurately positioning any selected type face carrying segment in a printing position and automatically operated spacer means for spacing for the next printing operation in direct proportion to the size type being printed, said spacer means including adjustable stop members on each type face carrying segment, one for each type face, and an arm adapted to engage a stop member to determine the forward movement of the drum carriage.

18. In a machine of the class described having a printing bed, a rotatable, angularly tiltable and laterally movable drum mounted above said printing bed, said drum having a plurality of type face carrying segments about its periphery, detent means for accurately positioning any selected type face carrying segment in a printing position and automatically operated spacer means for spacing for the next printing operation in direct proportion to the size type being printed.

19. The combination in a machine of the type described having a printing bed and a type drum movable to the right and to the left above said printing bed, said type drum having a plurality of type face carrying segments equally spaced about its periphery, of means for effecting a printing operation comprising a pivotally mounted hammer, and motor driven means for moving said hammer downwardly in a printing operation.

20. The combination in a machine of the type described having a printing bed and a type drum movable to the right and to the left and angularly tiltable above said printing bed, said type drum having a plurality of type face carrying segments equally spaced about its periphery, of means for effecting a printing operation comprising a pivotally mounted hammer, motor driven means for moving said hammer downwardly in a printing operation and means for guiding said hammer in a vertical plane.

21. The combination in a machine of the type described having a printing bed and a type drum movable to the right and to the left and angularly tiltable above said printing bed, said type drum having a plurality of type face carrying segments equally spaced about its periphery, of means for effecting a printing operation comprising a pivotally mounted hammer, motor driven means for moving said hammer downwardly in a printing operation and means for guiding said hammer in a vertical plane, said means comprising a parallelogram linkage therefor.

22. A show card printing device of the type described having a printing bed and a rotatable, sideways movable and tiltable type drum mounted thereabove in printing position, said type drum carrying a plurality of rows of different size type faces, and automatic spacing means associated with said type drum compensating for the different size type faces used.

LYMAN A. STINSON.

REFERENCES CITED

The following references are of record in the file of this patent:

UNITED STATES PATENTS

| Number | Name | Date |
| --- | --- | --- |
| 696,833 | Maxwell | April 1, 1902 |
| 1,018,511 | McFadden | Feb. 27, 1912 |
| 1,141,831 | Russell | June 1, 1915 |
| 2,149,984 | Stinson | March 7, 1939 |

FOREIGN PATENTS

| Number | Country | Date |
| --- | --- | --- |
| 16,131 | Great Britain | of 1905 |
| 28,122 | Great Britain | of 1906 |